United States Patent
Hoeller et al.

(10) Patent No.: US 11,597,025 B2
(45) Date of Patent: Mar. 7, 2023

(54) METHOD AND DEVICE FOR DETECTING A WELDING WIRE DIAMETER OR WELDING WIRE COMPOSITION IN A WELDING DEVICE

(71) Applicant: Fronius International GmbH, Pettenbach (AT)

(72) Inventors: Dieter Hoeller, Molln (AT); Heinz Hartl, Altenfelden (AT); Helmut Friedl, Sipbachzell (AT); Manfred Wimmer, Wels (AT)

(73) Assignee: Fronius International GmbH, Pettenbach (AT)

( * ) Notice: Subject to any disclaimer, the term of this patent is extended or adjusted under 35 U.S.C. 154(b) by 745 days.

(21) Appl. No.: 16/520,837

(22) PCT Filed: Feb. 2, 2018

(86) PCT No.: PCT/EP2018/052681
§ 371 (c)(1),
(2) Date: Jul. 24, 2019

(87) PCT Pub. No.: WO2018/146023
PCT Pub. Date: Aug. 16, 2018

(65) Prior Publication Data
US 2020/0086413 A1    Mar. 19, 2020

(30) Foreign Application Priority Data

Feb. 7, 2017  (EP) ..................... 17154951

(51) Int. Cl.
*B23K 9/095*  (2006.01)
*G01B 7/04*  (2006.01)
*G01B 7/06*  (2006.01)

(52) U.S. Cl.
CPC .............. *B23K 9/095* (2013.01); *G01B 7/048* (2013.01); *G01B 7/10* (2013.01)

(58) Field of Classification Search
None
See application file for complete search history.

(56) References Cited

U.S. PATENT DOCUMENTS 3,254,193 A * 5/1966 Phillips ................ B23K 9/1081
219/116
6,140,824 A * 10/2000 Spangenberg ....... G01D 3/0365
324/684

(Continued)

FOREIGN PATENT DOCUMENTS

CN      1471448 A    1/2004
CN    102680524 A    9/2012

(Continued)

OTHER PUBLICATIONS

Himmel, EP1710534-A1, Translated (Year: 2006).*

(Continued)

*Primary Examiner* — Geoffrey S Evans
(74) *Attorney, Agent, or Firm* — Maginot, Moore & Beck, LLP

(57) ABSTRACT

A detection device for detecting a diameter and/or composition of a welding wire and/or welding electrode for a welding device, includes an oscillating circuit, which has a coil through which the welding wire and/or welding electrode can be passed. The device further include an evaluation unit connected to the oscillating circuit for determining at least one first oscillating circuit parameter which is characteristic of an attenuation of an oscillation signal occurring in the oscillating circuit, and at least one second oscillating circuit parameter which is characteristic of a signal frequency f of the oscillation signal occurring in the oscillating circuit. The evaluation unit detects the diameter (Continued)

and/or composition of the welding wire passed through the coil of the oscillating circuit and/or of the welding electrode using the determined oscillating circuit parameters.

14 Claims, 9 Drawing Sheets

(56) References Cited

U.S. PATENT DOCUMENTS

| | | | |
|---|---|---|---|
| 2005/0168127 A1* | 8/2005 | Shei | C09K 11/7784 313/486 |
| 2005/0279819 A1* | 12/2005 | Stava | B23K 35/02 235/487 |

FOREIGN PATENT DOCUMENTS

| | | | | |
|---|---|---|---|---|
| CN | 103282153 A | | 9/2013 | |
| DE | 3427351 A | * | 2/1986 | ............... G01B 7/12 |
| DE | 69807004 T2 | | 4/2003 | |
| EP | 1 065 620 A2 | | 1/2001 | |
| EP | 1710534 A1 | * | 10/2006 | ............. G01B 7/125 |
| EP | 1710534 A1 | | 10/2006 | |
| JP | 05177356 A | * | 7/1993 | |
| JP | 10264005 A | * | 10/1998 | |
| WO | 2007027117 A1 | | 3/2007 | |
| WO | 2008031925 A1 | | 3/2008 | |
| WO | WO-2008031925 A1 | * | 3/2008 | ............. B23K 9/125 |
| WO | 2013/184742 A1 | | 12/2013 | |
| WO | 2014085000 A1 | | 6/2014 | |

OTHER PUBLICATIONS

Machine translation of DE3427351A, Jul. 2022 (Year: 2022).*
Machine translation of JP05177356A, Jul. 2022 (Year: 2022).*
International Search Report corresponding to International Application No. PCT/EP2018/052681 dated Apr. 19, 2018 (14 pages).

* cited by examiner

METHOD AND DEVICE FOR DETECTING A WELDING WIRE DIAMETER OR WELDING WIRE COMPOSITION IN A WELDING DEVICE

CROSS-REFERENCE TO RELATED APPLICATIONS

This application is a 35 U.S.C. 371 National Stage application of PCT/EP2018/052681, filed Aug. 2, 2018, and claims priority to European Application No. EP 17154951.2, filed on Feb. 7, 2017. The entire contents of the above-mentioned patent applications are incorporated herein by reference as part of the disclosure of this U.S. application.

BACKGROUND

Welding devices are used for joining articles in a material fit through the effect of heat or for coating components. The most common welding methods include MIG/MAG welding, WIG welding and MMA welding. Gas-shielded metal arc welding devices (GSMAW devices) can be used for metal active gas (MAG) or metal inert gas (MIG) welding, depending on the type of shielding gas. In a metal active gas method, an arc comes about between an introduced wire electrode and a workpiece. Shielding gas is supplied via a gas nozzle, in such a way that the melt is shielded from negative influences of the air atmosphere. The metal inert gas welding method works similarly to the MAG method, but the shielding gas does not actively participate in the welding process, but is merely for shielding from oxidation. Similarly to in MIG/MAG welding, in MMA welding too, the welding electrode is the arc carrier and simultaneously melting filler material. In MMA welding, the welding electrode is also referred to as a rod electrode. The arc heat melts the core wire of the rod electrode and the base material. At the same time, a casing of the rod electrode provides a bell jar for shielding the heated workpiece surface from chemical reactions with the surrounding air.

Conventional welding devices thus require filler metals, in particular welding wires, rod electrodes or filler wires. The supplied welding wires or welding electrodes may differ in composition or in diameter. For the welding process, it is essential that appropriate filler metals are supplied. Inappropriate filler metals which consist of a less appropriate material or have an inappropriate diameter lead to a reduction in quality in the products or articles produced by the welding process. A weld seam produced by an inappropriate filler metal may also pose a safety risk during use of the manufactured product.

SUMMARY OF THE DISCLOSURE

It is therefore an object of the present invention to provide a method and a device for reliably detecting a diameter and/or composition of a welding wire and/or welding electrode for a welding device.

The invention accordingly provides a method for detecting a diameter and composition of a welding wire and/or welding electrode for a welding device, comprising the following steps:
passing the welding wire through a coil which together with a capacitor forms an oscillating circuit,
determining at least one first oscillating circuit parameter which is characteristic of an attenuation of an oscillation signal occurring in the oscillating circuit and at least one second oscillating circuit parameter which is characteristic of a signal frequency of the oscillation signal occurring in the oscillating circuit, and
detecting the diameter and/or composition of the welding wire passed through the coil and/or of the welding electrode by means of the determined oscillating circuit parameters.

In one possible embodiment of the method according to the invention, the first oscillating circuit parameter includes an oscillating circuit quality of the oscillating circuit.

In a further possible embodiment of the method according to the invention, the first oscillating circuit parameter includes an eddy current loss of the oscillating circuit.

Within the present application, it is generally adhered to that eddy current losses also include further ohmic losses of the coil and any core losses due to hysteresis.

In a further possible embodiment of the method according to the invention, the first oscillating circuit parameter includes a signal attenuation of the oscillation signal.

In a further possible embodiment of the method according to the invention, the first oscillating circuit parameter includes a decay time of the oscillation signal.

In one possible embodiment of the method according to the invention, the second oscillating circuit parameter, which is characteristic of a signal frequency of the oscillation signal occurring in the oscillating circuit, includes an inductance of the coil of the oscillating circuit.

In a further possible embodiment of the method according to the invention, the diameter and/or composition of the welding wire passed through the coil of the oscillating circuit is determined as a function of the determined oscillating circuit parameters by comparison with reference values.

In a further possible embodiment of the method according to the invention, the reference values for different diameters and/or different compositions of welding wires specify expected oscillating circuit parameters.

In a further possible embodiment of the method according to the invention, the reference values of the oscillating circuit parameters are read out from a reference data store and compared with the determined oscillating circuit parameters for detecting the diameter and/or composition of the welding wire passed through the coil of the oscillating circuit.

In a further possible embodiment of the method according to the invention, the oscillating circuit parameters of the welding wire are determined while the welding wire is moving.

In a further possible embodiment of the method according to the invention, a message is outputted as a function of the determined diameter and/or determined composition of the welding wire.

In a further possible embodiment of the method according to the invention, welding parameters of the welding device are set automatically as a function of the determined diameter and/or as a function of the determined composition of the welding wire.

In a further possible embodiment of the method according to the invention, the welding wire is demagnetized by the coil of the oscillating circuit and/or by at least one further coil before the oscillating circuit parameters are determined.

In a further possible embodiment of the method according to the invention, the welding wire is demagnetized while the welding wire is moving.

In a further possible embodiment of the method according to the invention, the welding wire is demagnetized while the welding wire is stationary.

In a further possible embodiment of the method according to the invention, calibration is carried out using reference values and/or sensor values to determine the oscillating circuit parameters.

In a further possible embodiment of the method according to the invention, the welding wire consists of a plurality of connecting welding wire segments which each have their own diameter and/or their own composition.

In a further possible embodiment of the method according to the invention, transitions between different welding wire segments of the welding wire and/or an end of the welding wire are recognized by way of the determined change in the oscillating circuit parameters caused by the welding wire passed through the coil of the oscillating circuit.

In a further possible embodiment of the method according to the invention, markings which influence oscillating circuit parameters of the oscillating circuit are present along the welding wire passed through the coil of the oscillating circuit.

The invention accordingly provides a detection device for detecting a diameter and/or composition of a welding wire and/or welding electrode for a welding device, the detection device having:
- an oscillating circuit, which has a coil through which the welding wire and/or welding electrode can be passed, and
- an evaluation unit connected to the oscillating circuit for determining at least one first oscillating circuit parameter which is characteristic of an attenuation of an oscillation signal occurring in the oscillating circuit and at least one second oscillating circuit parameter which is characteristic of a signal frequency of the oscillation signal occurring in the oscillating circuit,
- the evaluation unit detecting the diameter and/or composition of the welding wire passed through the coil of the oscillating circuit and/or of the welding electrode by means of the determined oscillating circuit parameters.

In one possible embodiment of the detection device according to the invention, the oscillating circuit has an LC parallel oscillating circuit comprising a coil and a capacitor.

In a further possible embodiment of the detection device according to the invention, the evaluation unit determines the diameter and/or composition of the welding wire passed through the coil of the oscillating circuit as a function of the determined oscillating circuit parameters by comparison with reference values which are stored in a reference data store to which the evaluation unit has access.

In a further possible embodiment of the detection device according to the invention, the detection device has a demagnetization unit for demagnetizing the welding wire and/or welding electrode.

In a further possible embodiment of the detection device according to the invention, the detection device has a calibration unit for calibrating the determination of oscillating circuit components of the oscillating circuit.

In a further aspect, the invention further provides a welding device comprising a welding wire supply unit for supplying a welding wire and/or welding electrode and comprising a detection device for detecting a diameter and/or composition of the welding wire and/or welding electrode, the detection device of the welding device having:
- an oscillating circuit, which has a coil through which the welding wire and/or welding electrode can be passed, and
- an evaluation unit connected to the oscillating circuit for determining at least one first oscillating circuit parameter which is characteristic of an attenuation of an oscillation signal occurring in the oscillating circuit and at least one second oscillating circuit parameter which is characteristic of a signal frequency of the oscillation signal occurring in the oscillating circuit,
- the evaluation unit detecting the diameter and/or composition of the welding wire passed through the coil and/or of the welding electrode by means of the determined oscillating circuit parameters.

The invention accordingly provides a welding wire supply unit for supplying a welding wire and/or welding electrode, the welding wire supply unit having a detection device for detecting a diameter and/or composition of the welding wire and/or welding electrode, the detection device of the welding device having: an oscillating circuit, which has a coil through which the welding wire and/or welding electrode can be passed, and
- an evaluation unit connected to the oscillating circuit for determining at least one first oscillating circuit parameter which is characteristic of an attenuation of an oscillation signal occurring in the oscillating circuit and at least one second oscillating circuit parameter which is characteristic of a signal frequency of the oscillation signal occurring in the oscillating circuit,
- the evaluation unit detecting the diameter and/or composition of the welding wire passed through the coil and/or of the welding electrode by means of the determined oscillating circuit parameters.

DESCRIPTION OF THE DRAWINGS

Hereinafter, possible embodiments of the method according to the invention and device according to the invention for detecting a diameter and/or composition of a welding wire and/or welding electrode for a welding device are described in greater detail with reference to the accompanying drawings, in which.

DETAILED DESCRIPTION

Figure 1:
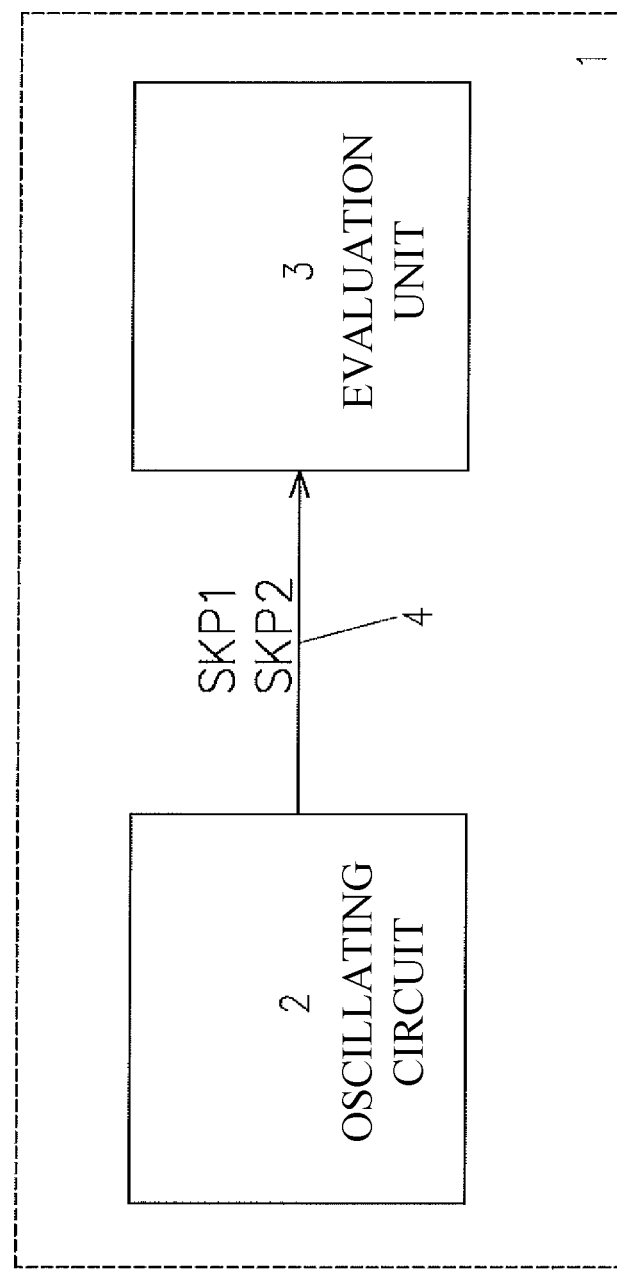
FIG. 1 is a block diagram illustrating an embodiment of a detection device according to the invention for detecting a diameter and/or composition of a welding wire and/or welding electrode for a welding device.

As can be seen from FIG. 1, in the embodiment shown a detection device 1 according to the invention has an oscillating circuit 2 and an evaluation unit 3. The detection device 1 shown in FIG. 1 is for detecting a diameter and/or composition of a welding wire and/or welding electrode for a welding device. The detection device 1 may for example be contained in a welding wire supply unit for supplying a welding wire and/or for supplying a welding electrode in the welding device. Further, in one possible embodiment, the detection device 1 may be integrated into a part or component of the welding device.

The detection device 1 contains an oscillating circuit 2, which has a coil through which the welding wire or welding electrode can be passed. The electrical oscillating circuit 2 is connected to an evaluation unit 3 of the detection device 1 via one or more signal lines 4. The signal lines 4 of the detection device 1 may be part of a signal line bus within the device.

The oscillating circuit 2 supplies oscillating circuit parameters SKP to the evaluation unit 3 via the signal lines 4. In this context, the oscillating circuit 2 preferably outputs at least one first oscillating circuit parameter SKP1 and one second oscillating circuit parameter SKP2 to the evaluation unit 3 for evaluation. In one possible embodiment, the evaluation unit 3 contains at least one processor for evaluating the contained oscillating circuit parameter SKP.

A first oscillating circuit parameter SKP1 of the oscillating circuit 2 is characteristic of an attenuation of an oscillation signal occurring in the oscillating circuit 2. In one possible embodiment, the first oscillating circuit parameter SKP1 includes an oscillating circuit quality of the oscillating circuit 2 and/or an eddy current loss of the oscillating circuit 2 and/or a signal attenuation of the oscillating signal within the oscillating circuit 2 and/or a decay constant of the oscillation signal within the oscillating circuit 2.

The oscillating circuit 2 is a resonant electrical circuit which has at least an electrical coil and a capacitor and can perform electrical oscillations. In one possible embodiment, the oscillating circuit 2 of the detection device 1 is an LC parallel oscillating circuit comprising a coil and a capacitor. The oscillating circuit 2 has one or more oscillating circuit parameters SKP which are characteristic of an attenuation of an oscillation signal occurring in the oscillating circuit 2. These first oscillating circuit parameters SKP1 of the oscillating circuit 2 include the oscillating circuit quality, eddy current losses, a signal attenuation and/or a decay time of the oscillation signal. In addition, the oscillating circuit 2 has oscillating circuit parameters SKP2 which are characteristic of a signal frequency f of the oscillation signal occurring in the oscillating circuit 2. A second oscillating circuit parameter SKP is formed for example by an inductance of the coil within the oscillating circuit 2.

In the oscillating circuit 2, electrical losses occur in the coil and capacitor thereof, and lead to the oscillation of the oscillating circuit being attenuated. A measure or oscillating circuit parameter for the occurring losses is for example a quality factor or oscillating circuit quality of the oscillating circuit 2.

The evaluation unit 3 determines at least one first oscillating circuit parameter SKP1 which is characteristic of the attenuation of the oscillation signal occurring in the oscillating circuit 2 and at least one second oscillating circuit parameter SKP2 which is characteristic of a signal frequency f of the oscillation signal occurring in the oscillating circuit 2. The evaluation unit 3 determines the diameter and/or composition of the welding wire passed through the electrical coil of the oscillating circuit 2 as a function of the oscillating circuit parameters SKP1, SKP2 by comparison with reference values. In a preferred embodiment, these reference values are stored in a reference data store, to which the evaluation unit 3 has access. In one possible embodiment, the reference data store is a local data store from which the evaluation unit 3 can read out the reference values. In an alternative embodiment, the reference data store may also be a non-local store or a database to which the evaluation unit 3 has access via a data network.

Figure 2:
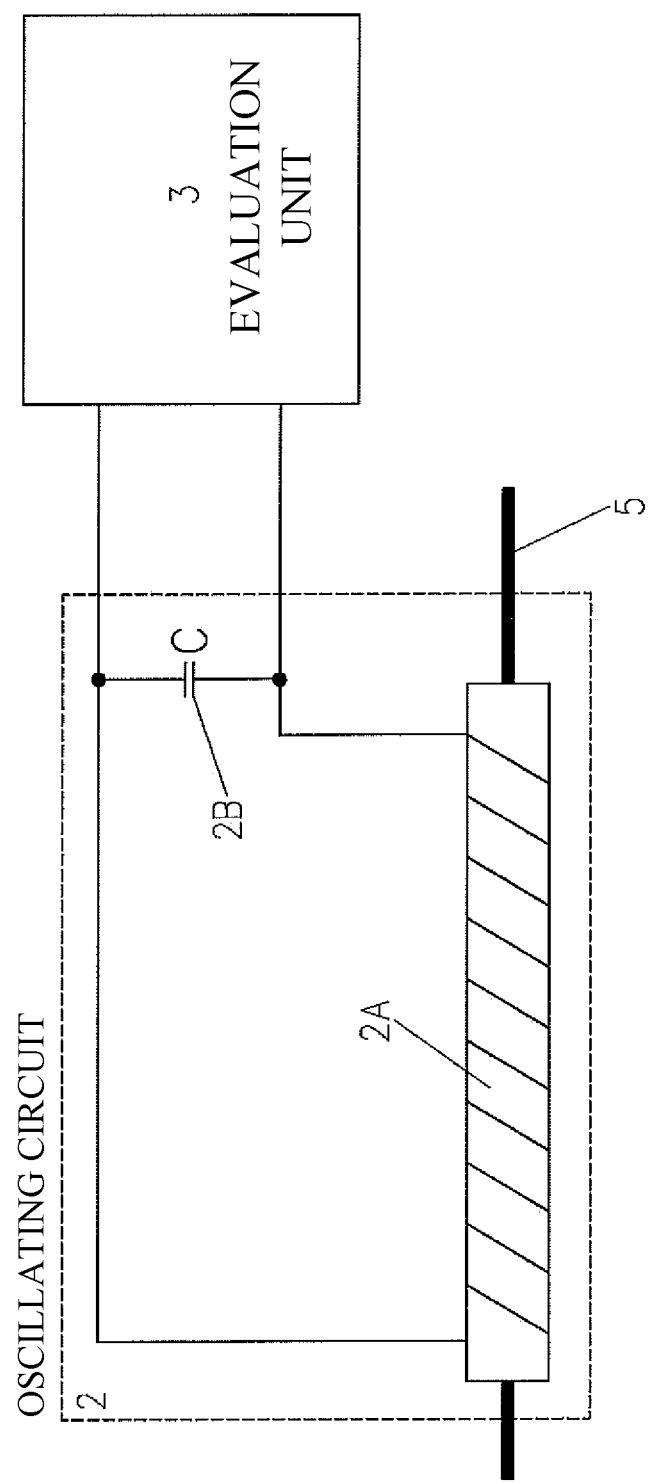
FIG. 2 shows an example embodiment of a detection device according to the invention according to FIG. 1.

FIG. 2 shows a simple embodiment of a detection device 1 according to the invention. In the embodiment shown in FIG. 2, the detection device 1 contains an LC parallel oscillating circuit 2 comprising an electrical coil 2A and at least one capacitor 2B connected in parallel therewith. Evaluation electronics of the evaluation unit 3 are connected to the parallel oscillating circuit 2.

In the embodiment shown in FIG. 2, the electrical coil 2A is a sensor air core through which a welding wire or welding electrode is passed. This electrode forms a filler metal. In one possible embodiment, the welding wire or welding electrode consists of a particular material. It is further possible for the supplied filler metal to comprise a plurality of layers which consist of different material. The welding wire is cylindrical and has a uniform diameter at least in portions. Further, in one possible embodiment, the welding wire or filler metal 5 may also consist of a plurality of connected welding wire segments, which each have their own diameter and/or their own chemical material composition. In one possible embodiment, transitions between different welding wire segments of the welding wire 5 and/or an end of the welding wire 5 are automatically recognized by the evaluation unit 3 of the detection device 1 by way of the determined changes in the oscillating circuit parameters SKP of the oscillating circuit 2 caused by the welding wire 5 passed through the coil 2A of the oscillating circuit 2. In a further possible embodiment, markings, for example indentations, which are appropriate for influencing oscillating circuit parameters SKP of the oscillating circuit 2 could be present along the welding wire 5 passed through the coil 2A of the oscillating circuit 2. In this way, the evaluation unit can automatically recognize and report markings which are applied along the welding wire or filler metal 5.

In one possible embodiment, the transport speed or movement speed of the welding wire or filler metal which is passed through the electrical coil 2A of the oscillating circuit 2 is detected. In one possible embodiment, this can take place by way of markings which are applied at uniform distances along the welding wire and which influence oscillating circuit parameters SKP of the oscillating circuit 2.

In the embodiment shown in FIG. 2, in addition to the coil 2A the oscillating circuit 2 has a capacitor 2B, which is connected in parallel with the coil 2A. In one possible embodiment, the capacitor 2B has a fixed capacitance which is known in advance. In an alternative embodiment, the capacitance of the oscillating circuit is formed by a parasitic capacitance of the coil 2A of the oscillating circuit 2.

In one possible embodiment, the diameter and/or composition of the welding wire or filler metal passed through the coil 2A of the oscillating circuit 2 is read out as a function of the determined oscillating circuit parameters SKP by comparison with reference values. In one possible embodiment, these reference values are read out from a reference data store. The reference values specify expected oscillating circuit parameters SKP for different diameters and/or different compositions of welding wires and/or welding electrodes. The reference values of the oscillating circuit parameters SKP are read out from the reference data store and compared with the determined oscillating circuit parameters SKP of the oscillating circuit 2 to detect the diameter and/or composition of the welding wire or filler metal passed through the coil 2A of the oscillating circuit 2.

In one possible embodiment of the detection device 1 according to the invention, the oscillating circuit parameters SKP are determined while the welding wire or filler metal is moving. Alternatively, the oscillating circuit parameters SKP can also be determined while the welding wire or filler metal is stationary.

As a function of the determined diameter and/or determined composition of the welding wire or filler metal, the evaluation unit 3 of the detection device 1 can output a message via an interface. For example, the evaluation unit 3 may report that the wrong filler metal or the wrong welding wire has been inserted. For example, the supplied filler metal may not match the set welding parameters SKP of the welding device or the contact tube of the welding device. The evaluation unit 3 of the detection device 1 can report or transmit the determined diameter and/or determined composition of the welding wire or filler metal 5 to a control unit of the welding device, which unit subsequently sets welding parameters SP automatically as a function of the diameter and/or as a function of the determined composition of the welding wire. In one possible embodiment, the control device may generate further control signals as a function of the diameter and/or composition of the welding wire. For example, for a welding wire which is detected as not matching, the supply of the welding wire can be stopped automatically. Further, for example for a diameter of the inserted welding wire which is recognized as being too small, the supply speed of the welding wire can be increased automatically so as to supply a sufficient amount of welding wire to the welding process. In a further possible embodiment, the determined diameter and/or the determined composition of the welding wire are automatically displayed to a user or welder via a user interface. For example, it may be displayed to the welder or user that the inserted welding wire is not appropriate and needs to be replaced. Further, for example, it may be displayed to a welder or user that the inserted welding wire does have the appropriate composition but not an appropriate diameter for the welding process.

In a further possible variant, the evaluation unit 3 may actuate a control unit in such a way that a diameter of the welding wire which is recognized as inappropriate is compensated by changing the supply speed of the welding wire in accordance with the required welding parameters of the welding process.

Figure 3:
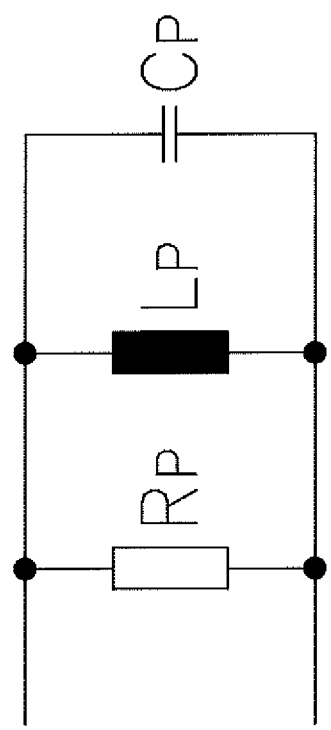
FIG. 3 shows an equivalent circuit diagram of the LC parallel oscillating circuit shown in FIG. 2 of the detection device.

FIG. 3 is an equivalent circuit diagram of the LC parallel oscillating circuit 2 shown in FIG. 2. The coil 2A of the LC parallel oscillating circuit 2 comprises an inductor $L_P$ and an ohmic resistor $R_P$. The ohmic resistor $R_P$ comprises the entire losses of the oscillating circuit, which are referred to as eddy current losses within the present application. As the inductance of the coil 2A increases, the frequency of the free oscillation signal of the oscillating circuit 2 falls. The increasing inductance of the coil 2A is brought about for example by a ferromagnetic filler material passed through the coil.

In one possible embodiment, the inductance of the coil 2A of the oscillating circuit 2 can thus be used as an oscillating circuit parameter SKP which is characteristic of a signal frequency of the oscillating signal occurring in the oscillating circuit 2. In one possible embodiment, the eddy current losses of the oscillating circuit 2 can be drawn on as an oscillating circuit parameter SKP which is characteristic of an attenuation of an oscillation signal occurring in the oscillating circuit 2.

Figure 4:
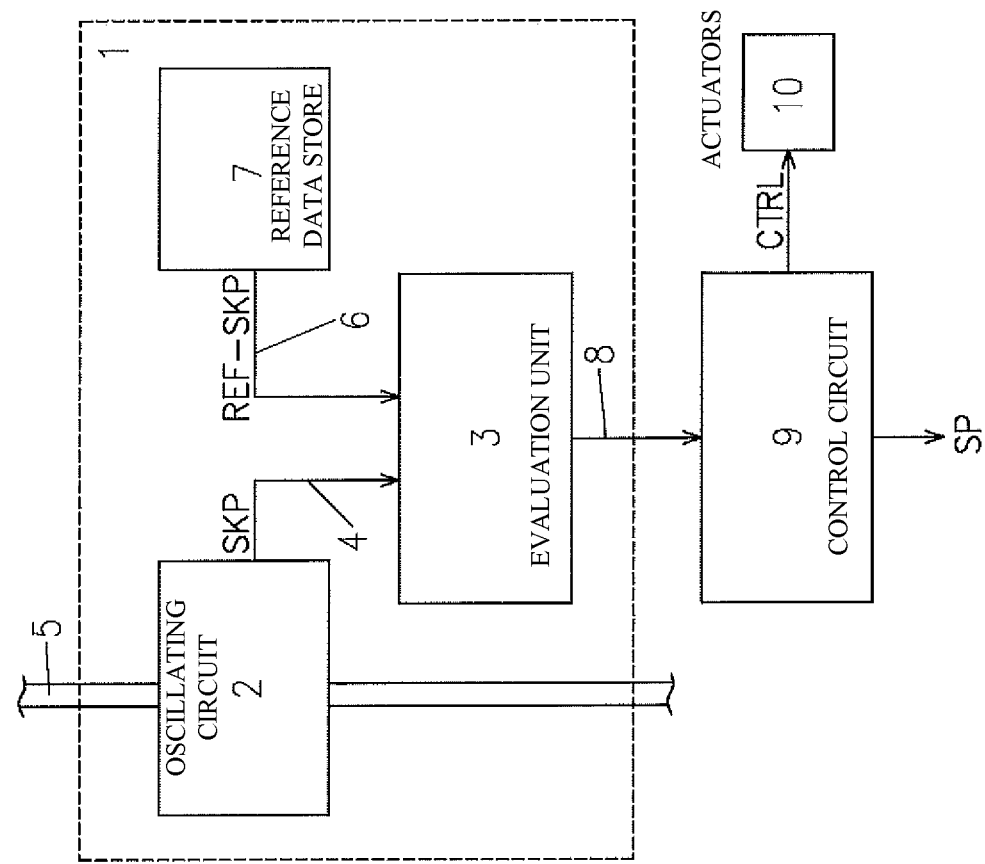
FIG. 4 is a block diagram illustrating a further embodiment of a detection device according to the invention.

FIG. 4 is a block diagram of a possible embodiment of the detection device 1 according to the invention. In the embodiment shown, the detection device 1 contains an oscillating circuit 2 which supplies oscillating circuit parameters SKP to the evaluation unit 3 of the detection device 1 via signal lines 4. A weld seam or filler metal 5 is passed through a coil of the oscillating circuit 2, as is shown in FIG. 4. The evaluation unit 3 is connected to a reference data store 7 of the detection device 1 via signal lines 6. The evaluation unit 3 determines the diameter and/or the composition of the welding wire 5 passed through the coil 2A of the oscillating circuit 2 as a function of the determined oscillating circuit parameters SKP by comparison with reference values which are stored in the reference data store 7. In one possible embodiment, the determined diameter and/or determined composition of the welding wire 5 may be transmitted to a control unit 9 of the welding device via signal lines 8 as a message. In one possible embodiment, the control unit 9 of the welding device sets one or more welding parameters SP automatically as a function of the diameter and/or the determined composition of the welding wire 5. Further, in one possible embodiment, the control unit 9 may further generate control signals CTRL via one or more actuators 10 of the welding device as a function of the determined diameter and/or as a function of the determined composition of the welding wire 5. For example, an actuator 10 may automatically stop the supply of the welding wire 5 to the welding process if the determined diameter and/or the determined composition of the welding wire 5 are inappropriate for the welding process. In a further possible embodiment of the detection device 1 according to the invention, for quality control, the diameter and/or composition of the welding wire 5 which are determined by the evaluation unit 3 are also protocolled or are stored for further data processing.

Figure 5:
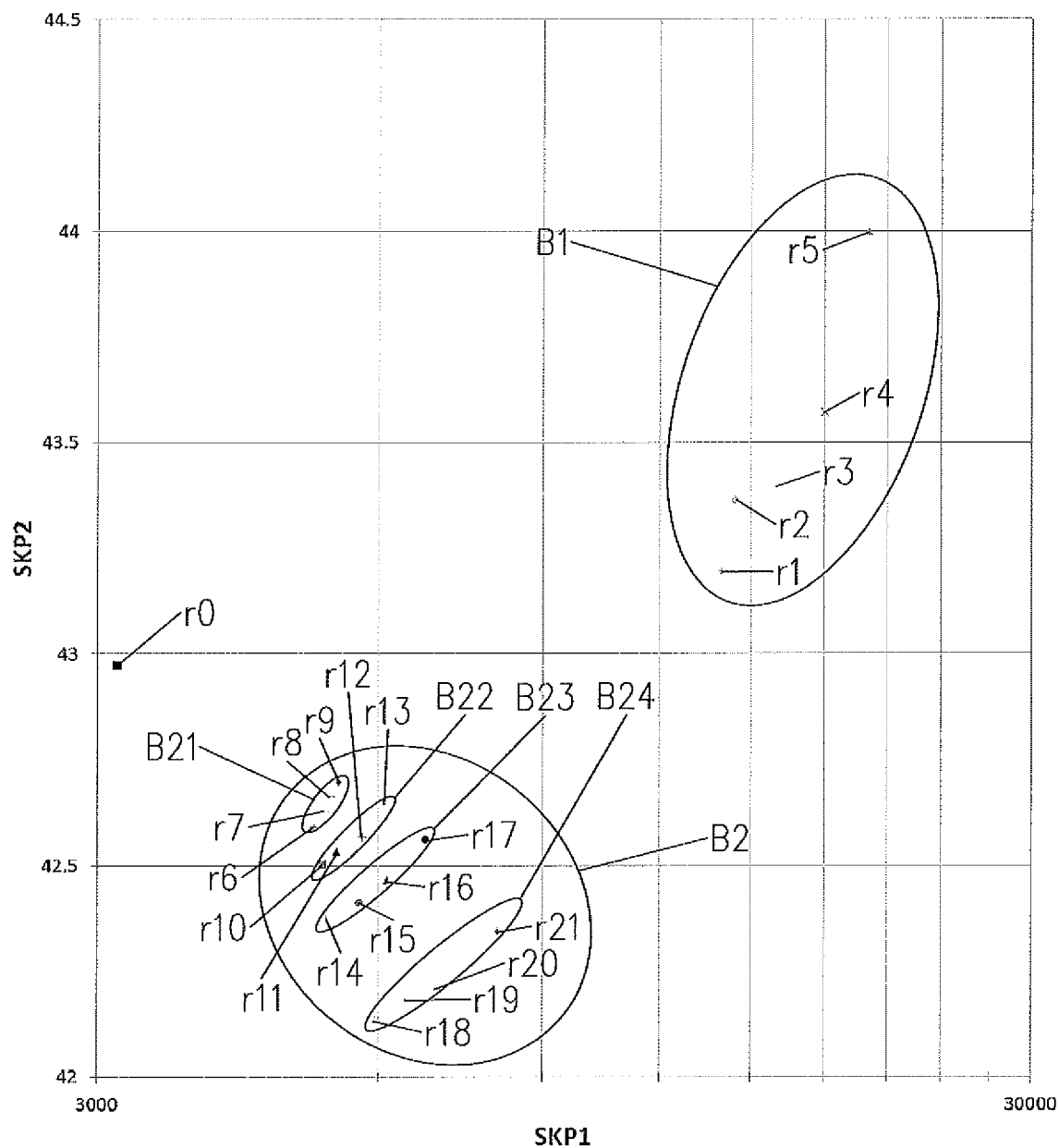
FIG. 5 is a graph illustrating the mode of operation of an example embodiment of the method according to the invention and device according to the invention by means of reference values.

FIG. 5 is a graph illustrating the mode of operation of a detection device 1 according to the invention or method according to the invention for detecting a diameter and/or detecting a composition of a welding wire and/or welding electrode for a welding device. The graph of FIG. 5 shows reference values which can be saved in a reference data store 7 and which make it possible for the evaluation unit 3 of the detection device 1 automatically to determine or recognize a diameter and/or composition of the supplied welding wire 5. The illustrated graph shows comparison or reference measurement values for different filler metals or welding wires having different diameters and different materials or compositions for different eddy current losses and inductances. In the graph of FIG. 5, the x-axis denotes eddy current losses. The eddy current losses form a first oscillating circuit parameter SKP1 of the oscillating circuit 2, which is characteristic of an attenuation of an oscillation signal occurring in the oscillating circuit 2. The inductance L, shown on the y-axis, of the coil 2A of the oscillating circuit 2 forms a second oscillating circuit parameter SKP2, which is characteristic of a signal frequency f of the oscillation signal occurring in the oscillating circuit 2.

The graph of FIG. 5 shows various reference values r for different filler metals. In this context, each pair of expected oscillating circuit parameters SKP forms the associated reference value in a particular known filler metal 5. The graph of FIG. 5 is two-dimensional and comprises an x-axis for a first oscillating circuit parameters SKP1 and a y-axis for a second oscillating circuit parameter SKP2. In one possible embodiment, threedimensional or multidimensional reference value tables are used, which contain reference values r for more than two different oscillating circuit parameters SKP. For example, the two-dimensional reference data field of FIG. 5 may be extended with a third dimension or z-axis, which forms a third oscillating circuit parameter SKP3 of the oscillating circuit 2 or another measured parameter. Thus, in one possible embodiment, the diameter of the filler metal can be determined using other means, for example mechanical measurement. If the diameter is known, as a $3^{rd}$ parameter, the recognition of the composition of the filler metal can be improved, since only more reference values r having the same diameter have to be considered. If a measured first oscillating circuit parameter SKP1, for example an eddy current loss, and a second oscillating circuit parameter SKP2, for example the coil inductance, correspond to a reference value plotted in the graph of FIG. 5 and stored in the reference data store 7, the evaluation unit 3 recognizes from the two oscillating circuit parameters SKP1, SKP2 that the filler metal is the corresponding known filler metal. When the measured oscillating circuit parameters SKP1, SKP2 are being matched with the plotted reference oscillating circuit parameters r, a particular filler metal can thus be detected. If there is no match or correspondence, the supplied filler metal 5 is not recognized by the evaluation unit 3, it being possible for this to be reported via an interface, for example a control unit of the welding device. If the supplied filler metal 5 is not recognized, the control unit can actuate an actuator 10 of the welding device accordingly, for example stopping the supply of the filler metal. Further, a welder or user can be informed that the inserted filler metal was not recognized and may not be appropriate for the desired welding process. A user or welder can subsequently check whether or not the inserted unrecognized filer metal needs to be replaced. If the unrecognized filler metal is still appropriate for the welding process, the user or welder can instruct the welding device to continue the welding process with the inserted filler metal. In a further possible embodiment, the user or welder can additionally input, via a user interface, a command which causes the evaluation unit 3 of the detection device 1 to write or save the oscillating circuit parameters SKP determined for the unknown filler metal in the reference data store 7 automatically, the user making, via a user interface, an input which assigns the filler metal 5 which is known to him to the stored oscillating circuit parameters SKP. For example, a welder or user can input via the user interface that the previously unknown filler metal which is not stored in the reference data store is an aluminium (AlMg5) welding wire having a diameter of 1 mm.

Further variant configurations are possible. If for example no unique match or unique correspondence with stored reference values r of known filler metals is found from the determined oscillating circuit parameters SKP, in one possible variant configuration a rough assignment to a material class, for example to ferromagnetic materials (FIG. 5, group B1), can be made from the determined oscillating circuit parameters SKP. By contrast, FIG. 5, group B2 comprises diamagnetic and paramagnetic materials. If on the basis of this rough determination to a determined group of filler metals the inserted filler metal 5 is inappropriate for the current welding process, in one possible embodiment this may be reported to the welder or user and optionally the welding process may additionally be interrupted by actuators 10.

In one possible embodiment, the detection device 1 may automatically recognize a filler material and/or material thickness or material diameter of the supplied filler metal 5 and optionally report these via an interface. Further, the control unit 9 may set welding parameters SP automatically on the basis of the detected filler metal. Further, in one possible embodiment, the evaluation unit 3 can detect from the determined oscillating circuit parameters SKP whether a filler metal is even present, for example if the determined oscillating circuit parameters are outside a specified range or close to a reference value r0 stored for this purpose. r0 forms the reference value of the oscillating circuit parameters when filler metal is not present. In this case, a user or welder can be informed of this via a user interface and asked to insert a filler metal 5.

Further variant configurations are possible. As can be seen from the graph of FIG. 5, for example various filler metals or welding wires which differ in composition but for example have the same diameter d have a particular linear dependence between the inductance L of the oscillating circuit coil and the occurring eddy current losses. This is represented for example in FIG. 5 by way of the groups B21, B22, B23 and B24. Thus, for example, the group B24 of diamagnetic and paramagnetic filler metals 5 (r18 to r21) has a diameter d of 1.6 mm, the filler metals 5 consisting of different materials or having a different composition. If, when the oscillating circuit parameters SKP are determined while an unknown filler metal 5 is inserted, an inductance and eddy current loss are measured or determined which is close to an extrapolated curve of a particular group of filler metals which do consist of different materials but have the same diameter, it can be detected from the reference value graph of FIG. 5 that the filler metal 5 used presumably has the corresponding diameter d, without being able to assign it a unique material composition.

In a further possible embodiment, it can be calculated from a distance between the sensor-determined oscillating circuit parameters SKP and the reference oscillating circuit parameters r ($SKP1_r$, $SKP2_r$), in accordance with the reference values shown in FIG. 5, how great the probability P is that the inserted filler metal 5 is one of the known, stored filler metals. The greater the distance between the point defined by the two oscillating circuit parameters SKP1, SKP2 and the stored reference point r, the lower the probability P that this is the known filler metal in question.

In a further possible embodiment, it may for example be established from the oscillating circuit parameters whether the material of the filler metal 5 is a diamagnetic or paramagnetic material (group B2) or a ferromagnetic material (group B1). In the case of ferromagnetic materials, for precise differentiation of the material, it may be necessary to demagnetize the material before the measurement.

In one possible embodiment of the detection device 1 according to the invention, it additionally has a demagnetization unit for demagnetizing the welding wire and/or welding electrode. Possible variant configurations are shown in the block diagrams of FIG. 7, 8.

Figure 7:
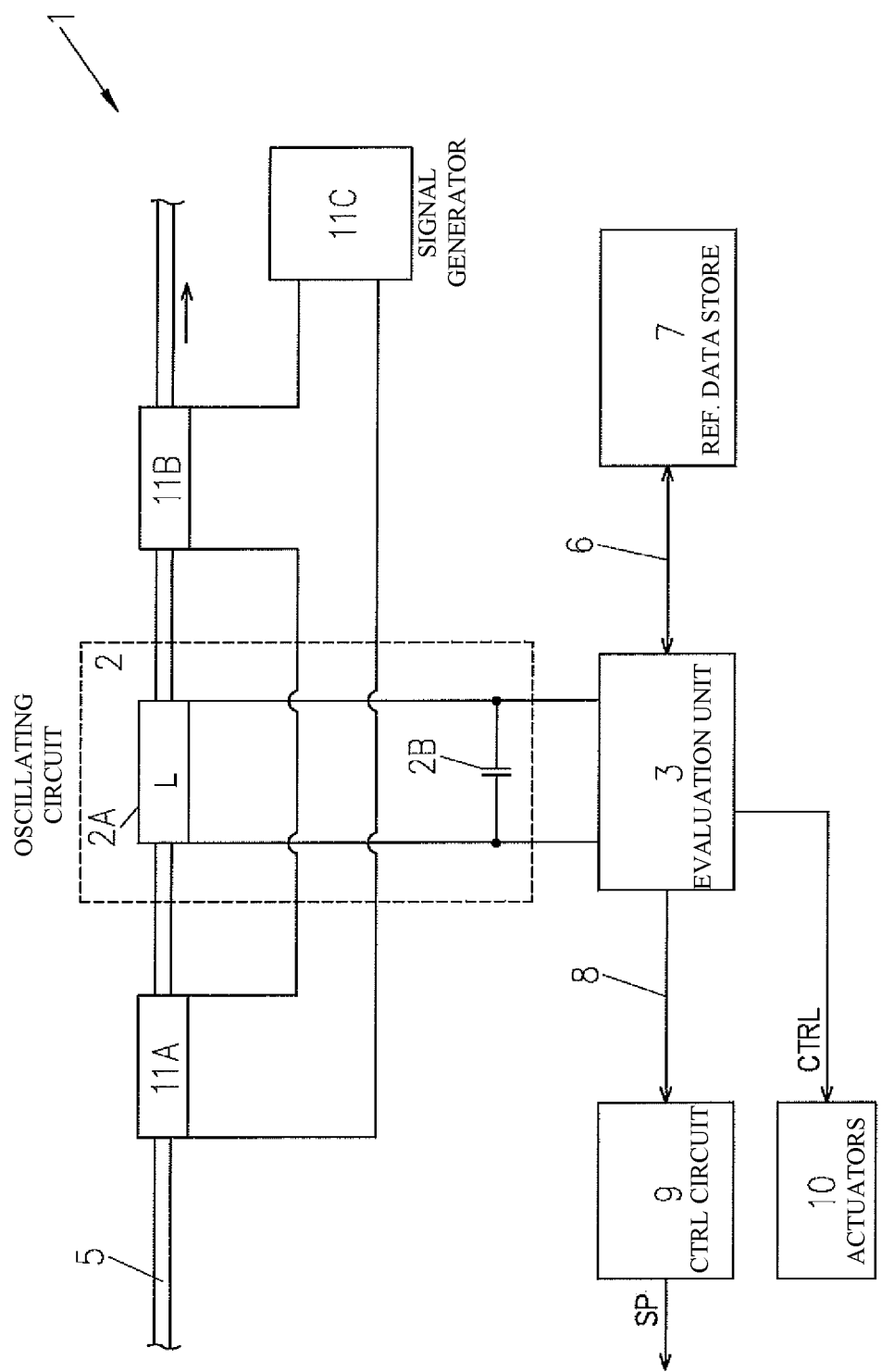
FIG. 7 is a further block diagram illustrating a further possible embodiment of the detection method according to the invention and detection device according to the invention.

In the variant configuration shown in FIG. 7, the demagnetization unit 11 of the detection device 1 comprises two coils 11A, 11B connected in series, through which the filler material or welding wire 5 is passed. In the embodiment shown in FIG. 7, the two coils 11A, 11B are provided on the two sides of the coil 2A of the oscillating circuit 2. The two demagnetization coils 11A, 11B connected in series are connected to a signal generator 11C of the demagnetization unit 11, which actuates the two demagnetization coils 11A, 11B in such a way that a strong alternating magnetic field occurs, which gradually decays so as to demagnetize the material of the filler metal or welding wire passed through the demagnetization coils 11A, 11B. In this context, the magnetic field is preferably sufficiently strong that the coercive field strength of the magnetised material is reached.

The alternating field results in hysteresis of the materials with a decreasing amplitude. In this context, a hysteresis curve having decreasing amplitude of the magnetic field strength and of the magnetic flux density can be followed until the permanent magnetic field is zero. In the variant configuration shown in FIG. 7, the demagnetization preferably takes place while the wire is stationary or while the filler metal 5 is stationary. Initially, the filler metal or welding wire 5 is demagnetized, and subsequently the oscillating circuit parameters SKP of the oscillating circuit 2 are determined using the coil 2A of the oscillating circuit 2 through which the filler material 5 is moved.

In one possible variant configuration, the material of the supplied welding wire 5 is initially roughly determined using the oscillating circuit 2. If the material of the welding wire 5 is a ferromagnetic material, demagnetization subsequently takes place by means of the demagnetization unit 11. In a further step, the diameter and/or composition of the welding wire 5 is subsequently more precisely determined. In the variant configuration shown in FIG. 7, the H field extends substantially parallel to the orientation of the filler metal or welding wire 5. As a result, the H field can be bundled onto the welding wire 5 appropriately. To demagnetize the welding wire 5 uniformly, in the variant configuration shown in FIG. 7 a magnetisation coil 11A, 11B is placed before and after the sensor coil 2A of the oscillating circuit 2. For example, by means of the signal generator 11C, a 100 Hz sinusoidal signal can be applied, decaying over a period of 1 to 2 s, to the demagnetization coils 11A, 11B so as to demagnetize the welding wire 5. To save space and increase efficiency, the decaying sinusoidal current can be generated using an H bridge (PWM).

Figure 8:
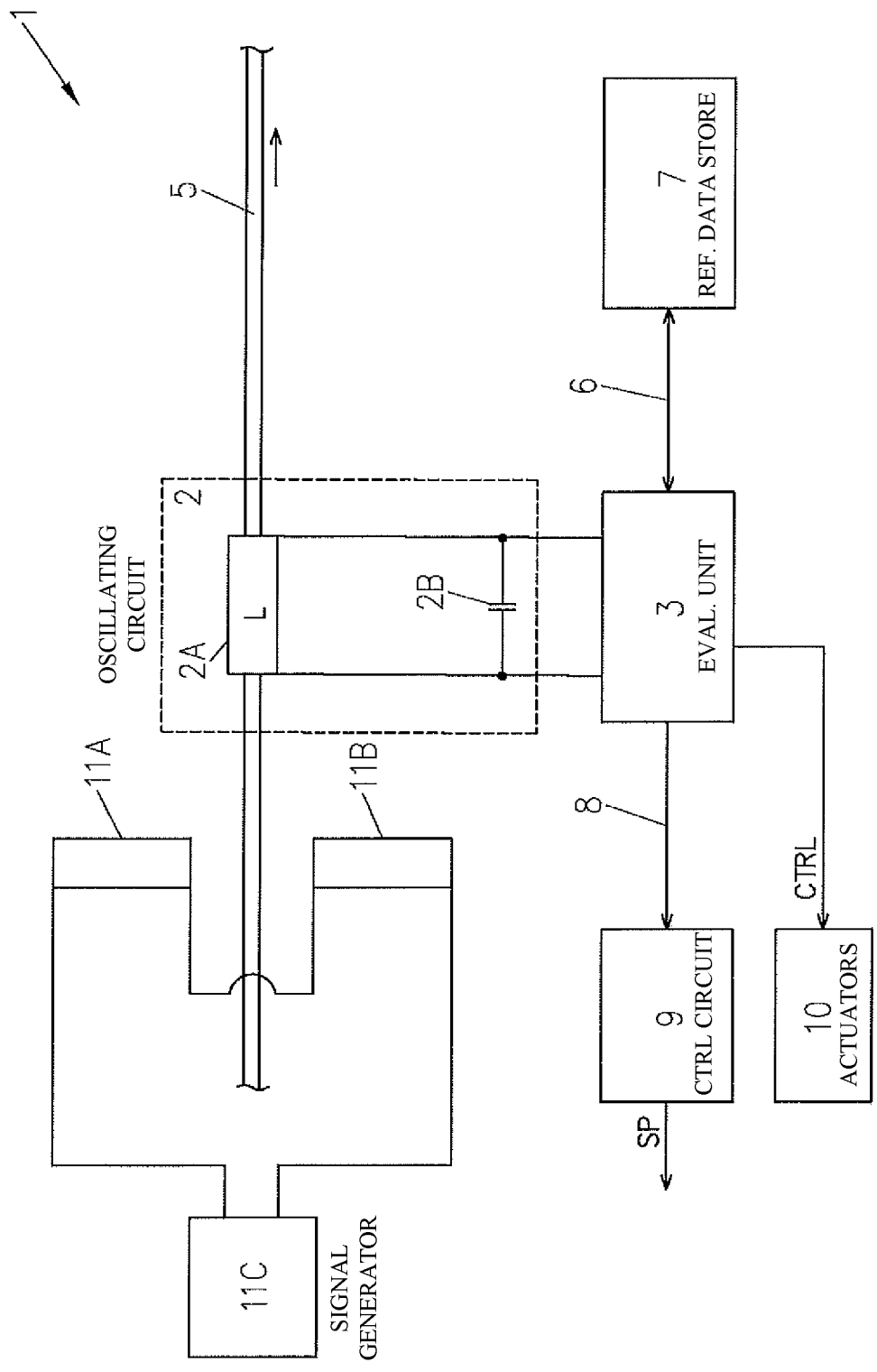
FIG. 8 is a further block diagram illustrating an example embodiment of a detection method according to the invention and detection device according to the invention.

FIG. 8 shows a further variant configuration of a detection device 1 comprising a demagnetization unit 11. In the variant configuration shown in FIG. 8, the field lines of the H field extend substantially perpendicular to the orientation of the welding wire 5. In the variant configuration shown in FIG. 8, the welding wire is demagnetized while the welding wire 5 is moving. A magnetic alternating field is guided through the welding wire 5 normal to the wire movement. As a result of the movement of the welding wire, the magnetic field decays.

In a further possible embodiment, information or data can also be magnetised onto the welding wire 5 using the arrangement 11 shown in FIG. 8. In this variant configuration, similarly to in a tape cassette, information or data can be magnetised onto or stored on the welding wire 5, and can be read out elsewhere.

Further variant configurations of the detection device 1 according to the invention and method according to the invention for detecting a diameter and/or composition of a welding wire and/or welding electrode for a welding device are possible.

In one possible variant configuration, a measurement takes place at various frequencies. For similar alloys or compositions, a measurement can take place at various frequencies for better distinction.

Figure 6:
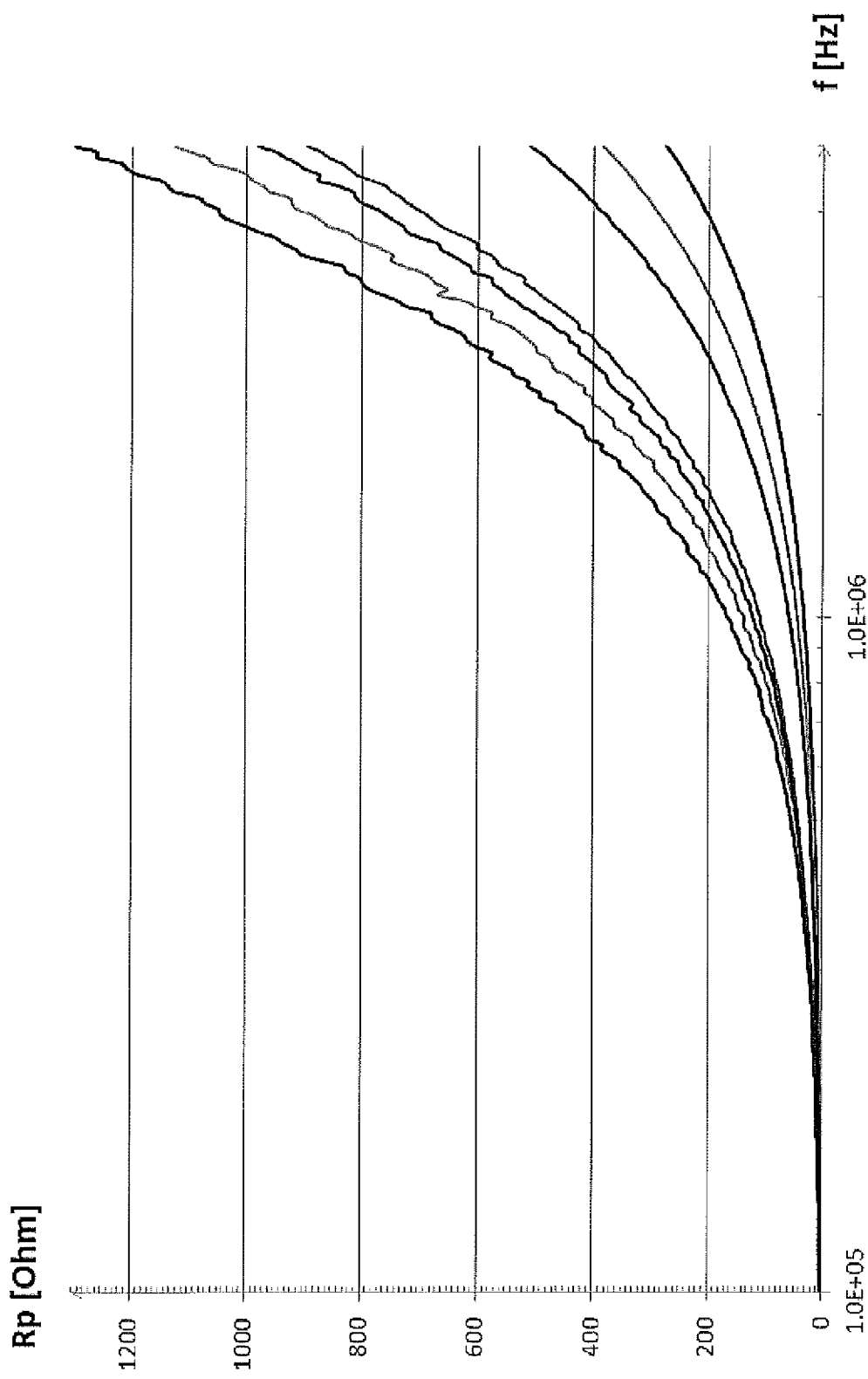
FIG. 6 is a further graph illustrating an example embodiment of the method according to the invention and detection device according to the invention.

FIG. 6 is a graph in which eddy current losses of different materials are determined by way of the frequency f. The ohmic losses $R_p$ (ohms) brought about by the eddy current losses are shown as a function of the frequency f of the oscillating circuit 2. Different materials of welding wires behave differently with respect to the frequency f. The eddy current losses increase as the frequency f rises.

In a further possible embodiment of the detection device 1 according to the invention, the detection device 1 additionally has a calibration unit for calibrating oscillating circuit components of the oscillating circuit 2. In this context, the calibration can take place by means of reference values and/or by means of sensor values. Oscillating circuit parameters SKP may depend on external influences, for example temperature and air humidity or the like. In one possible embodiment, the temperature T and/or air humidity are determined by means of a sensor system, and the oscillating circuit 2 is initially calibrated or adjusted by way of the sensor values.

In one possible embodiment of the calibration, it may also take place by way of the reference values. For this purpose, a measurement is taken without filler metal or with a known filler metal, and the difference between the determined oscillating circuit parameters and the reference values is drawn on for the calibration. For example, in subsequent measurements, the difference between the determined oscillating circuit parameters can be subtracted to obtain oscillating circuit parameters calibrated to the reference values. In a preferred embodiment, the reference measurement is carried out without filler metal.

In one possible embodiment of the detection device 1 according to the invention, after calibration of the measurement arrangement, the welding wire 5 is subsequently demagnetized if required. After calibration and demagnetization, the oscillating circuit parameters SKP of the oscillating circuit 2 are subsequently measured or determined to determine the diameter and/or composition of the welding wire or filler metal 5. Depending on the determined or detected diameter or composition of the welding wire 5 passed through the coil 2A, welding parameters SP can subsequently be set automatically and/or actuators 10 can be actuated by a control unit 9. It is further possible also automatically to recognize transitions between different welding wire segments of the welding wire 5 and/or an end of the welding wire 5 by way of the determined change in the oscillating circuit parameters SKP of the welding wire 5 passed through the coil 2A of the oscillating circuit 2.

Figure 9:
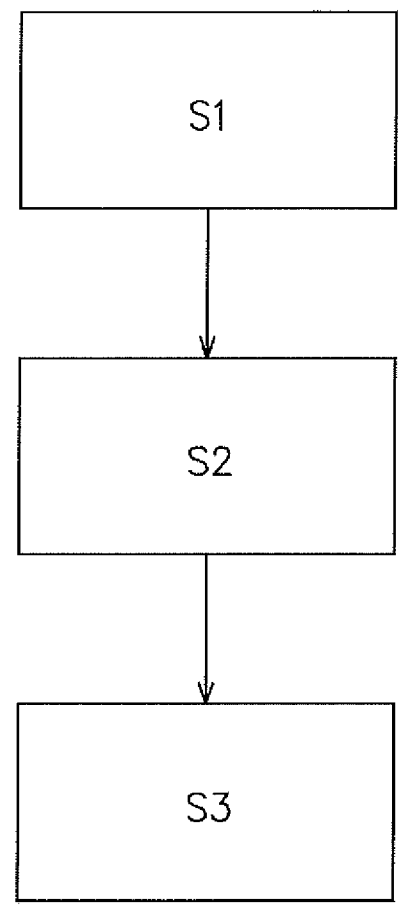
FIG. 9 is a simple flow chart illustrating an example embodiment of the detection method according to the invention.

FIG. 9 is a flow chart illustrating an example embodiment of the method according to the invention for detecting a diameter and/or composition of a welding wire 5 and/or welding electrode 5 for a welding device. In the embodiment shown, the method according to the invention basically comprises three steps.

In a first step S1, a welding wire is passed through a coil which together with a capacitor forms an oscillating circuit.

Subsequently, in a further step S2, at least one first oscillating circuit parameter SKP1, which is characteristic of an attenuation of an oscillation signal occurring in the oscillating circuit, and at least one second oscillating circuit parameter SKP2, which is characteristic of a signal frequency of the oscillation signal occurring in the oscillating circuit, are determined.

Finally, in step S3, the diameter and/or composition of the welding wire passed through the coil and/or welding electrode passed through the coil are detected by way of the determined oscillating circuit parameters. This preferably takes place as a function of the oscillating circuit parameters SKP determined in step S2, by comparison with reference values which are read out from a reference value data store. The reference values specify expected oscillating circuit parameters for various diameters and/or various compositions of welding wires. The reference values of the oscillating circuit parameters are read out from the reference data store and compared with the determined oscillating circuit parameters for detecting the diameter and/or composition of the welding wire passed through the coil of the oscillating circuit. In one possible embodiment, the oscillating circuit parameters SKP can be determined in step S2 while the welding wire is moving. In an alternative embodiment, the oscillating circuit parameter is determined in step S2 while the welding wire is stationary. In one possible embodiment, the diameter detected in step S3 and/or composition determined in step S3 of the welding wire may be outputted to a control unit via an interface and/or to a user via a user interface. Subsequently, in a further step, welding parameters SP of the welding device may be set automatically as a function of the transmitted diameter and/or transmitted composition of the welding wire. In one possible embodiment, before the welding wire is passed through the coil of the oscillating circuit in step S1, components of the detection device may be calibrated and/or the supplied welding wire may be demagnetized.

An advantage of the method according to the invention for detecting a diameter and/or composition of a welding wire is that the oscillating circuit parameters can be determined or the measurement can be taken contactlessly during the welding operation. The method according to the invention is appropriate for quality control of a welding process. Both a material or material composition and a diameter of a supplied filler metal can be recognized, or at least a plausibility check can be performed. The method according to the invention makes it possible to establish whether a wire electrode or a filler metal is actually being gripped in the welding device. The wire electrode or welding electrode can be checked in terms of diameter and material using a selected characteristic welding line, a welding instruction, and the welder or user can obtain corresponding feedback via a display. Further, a corresponding characteristic welding line can be selected automatically on the basis of the detected diameter and on the basis of the detected composition of the welding wire. Further, the method according to the invention makes possible reference value determination of filler materials used and feedback regarding possible deviations in the desired filler metal and in the filler metal which is actually being gripped. In one possible embodiment, the evaluation unit 3 of the detection device 1 may actuate a current source of the welding device. In one possible embodiment, the supplied welding wire is demagnetized once it is recognized that it consists of a ferromagnetic material. In an alternative embodiment, demagnetization is always performed automatically independently of the recognized material group. The method according to the invention is appropriate for any welding methods in which filler metals of a welding process are supplied. The detection device 1 according to the invention may be integrated into a welding device. In a further possible embodiment, the detection device 1 may also be integrated into a separate welding wire supply device.

LIST OF REFERENCE NUMERALS

1 Detection device
2 Oscillating circuit
2A Coil
2B Capacitor
3 Evaluation unit
4 Line/bus
5 Filler metal
6 Line
7 Reference value data store
8 Line
9 Control unit
10 Actuator
11 Demagnetization unit
11A Demagnetization coil
11B Demagnetization coil
11C Signal generator

The invention claimed is:

1. Method for detecting a diameter and/or composition of a welding wire and/or welding electrode for a welding device, comprising the following steps:
   (a) passing the welding wire through a coil which together with a capacitor forms an oscillating circuit;
   (b) determining at least one first oscillating circuit parameter which is characteristic of an attenuation of an oscillation signal occurring in the oscillating circuit and at least one second oscillating circuit parameter which is characteristic of a signal frequency of the oscillation signal occurring in the oscillating circuit;
   (c) detecting at least one of the diameter and the composition of at least one of the welding wire passed through the coil of and the welding electrode by means of the determined oscillating circuit parameter;
   (d) wherein the welding wire is demagnetised by at least one of the coil of the oscillating circuit and at least one further coil before the oscillating circuit parameters are determined.

2. Method according to claim 1, wherein the first oscillating circuit parameter includes at least one of an oscillating circuit quality of the oscillating circuit, an eddy current loss of the oscillating circuit, a signal attenuation of the oscillation signal and a decay time of the oscillation signal.

3. Method according to claim 1, wherein the second oscillating circuit parameter includes an inductance of the coil of the oscillating circuit.

4. Method according to claim 1, wherein at least one of the diameter and the composition of the welding wire passed through the coil of the oscillating circuit are determined as a function of the determined oscillating circuit parameters by comparison with reference values.

5. Method according to claim 4, wherein the reference values specify expected oscillating circuit parameters for at least one of different diameters and different compositions of welding.

6. Method according to claim 4, wherein the reference values of the oscillating circuit parameters are read out from a reference value database and compared with the determined oscillating circuit parameters to detect at least one of the diameter and the composition of the welding wire passed through the coil of the oscillating circuit.

7. Method according to claim 1, wherein the oscillating circuit parameters are determined while the welding wire is moving.

8. Method according to claim 1, wherein a message is outputted as a function of the determined diameter and/or determined composition of the welding wire.

9. Method according to claim 1, wherein welding parameters of the welding device are set automatically as a function of at least one of the determined diameter and the determined composition of the welding wire.

10. Method according to claim 1, wherein the welding wire is demagnetised while the welding wire is moving.

11. Method according to claim 1, wherein the oscillating circuit parameters of the oscillating circuit are calibrated using at least one of reference values and sensor values.

12. Method according to claim 1, wherein the welding wire consists of a plurality of connected welding wire segments, each wire segment having least one of its own diameter and its own composition.

13. Method according to claim 12, wherein at least one of transitions between different welding wire segments of the welding wire and an end of the welding wire are recognised by way of the determined change in the oscillating circuit parameters caused by the welding wire passed through the coil of the oscillating circuit.

14. Method according to claim 1, wherein markings which influence oscillating circuit parameters of the oscillating circuit are present along the welding wire passed through the coil of the oscillating circuit.

* * * * *